Feb. 10, 1970   G. HOLLANDS ET AL   3,494,407
FOLDING PARTITION ASSEMBLY
Filed Sept. 12, 1968   6 Sheets-Sheet 1

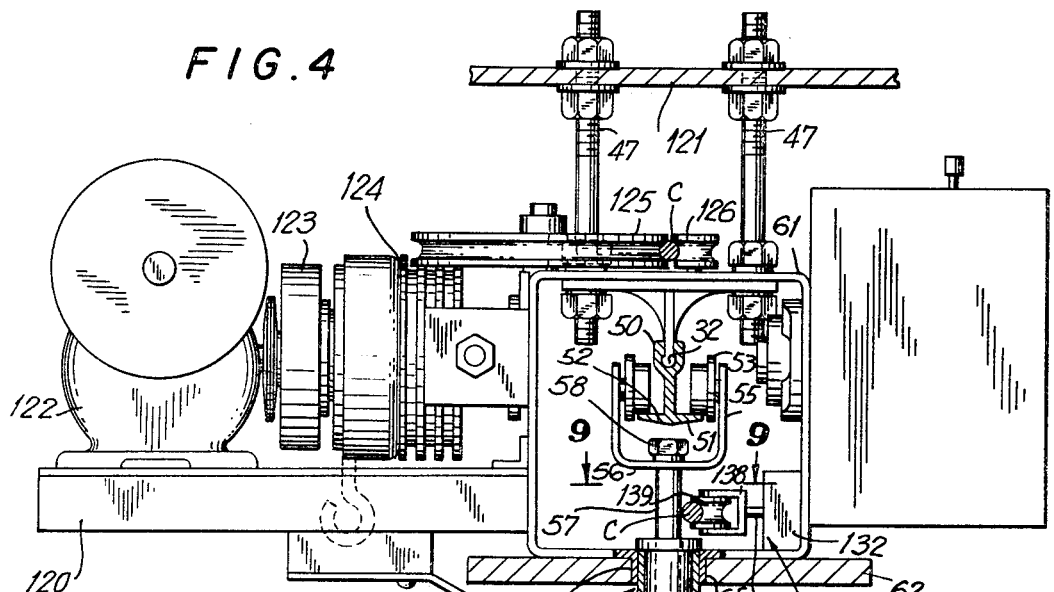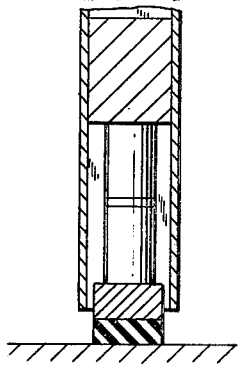

INVENTORS
GEORGE HOLLANDS
JOSEPH PERRETTI
DANIEL M. BEDRIN
SYLVESTER G. AVALLONE

Mark Bassecher

ATTORNEY

INVENTORS
GEORGE HOLLANDS
JOSEPH PERRETTI
DANIEL M. BEDRIN
SYLVESTER G. AVALLONE

ATTORNEY

INVENTORS
GEORGE HOLLANDS
JOSEPH PERRETTI
BY DANIEL M. BEDRIN
SYLVESTER G. AVALLONE

ATTORNEY

Feb. 10, 1970     G. HOLLANDS ET AL     3,494,407
FOLDING PARTITION ASSEMBLY

Filed Sept. 12, 1968     6 Sheets-Sheet 5

INVENTORS
GEORGE HOLLANDS
JOSEPH PERRETTI
DANIEL M. BEDRIN
SYLVESTER G. AVALLONE

ATTORNEY

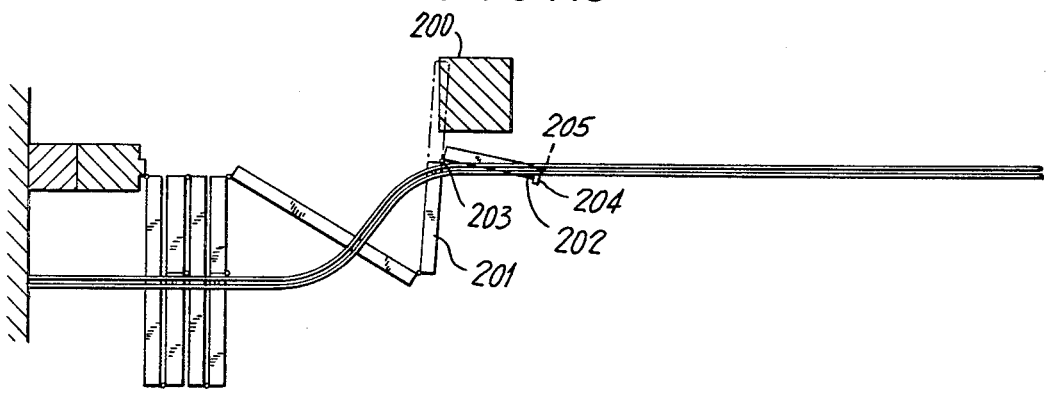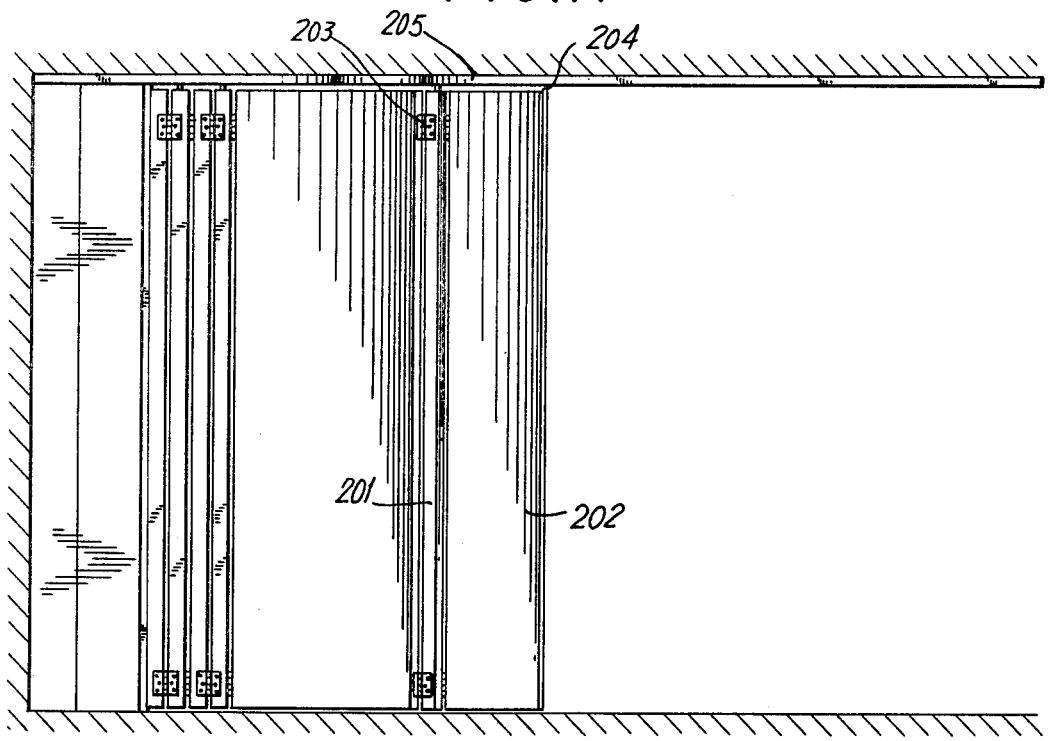

United States Patent Office 3,494,407
Patented Feb. 10, 1970

3,494,407
FOLDING PARTITION ASSEMBLY
George Hollands, Franklin Square, N.Y., Joseph Perretti, Northvale, N.J., and Daniel M. Bedrin, Brooklyn, and Sylvester G. Avallone, Seaford, N.Y., assignors to Torjesen, Inc., Brooklyn, N.Y., a corporation of New York
Filed Sept. 12, 1968, Ser. No. 759,379
Int. Cl. E05d 15/26
U.S. Cl. 160—199
17 Claims

ABSTRACT OF THE DISCLOSURE

A top, center hung, foldable partition assembly shiftable between an extended partition defining position and a one side of center stacked storage position, characterized by the absence of any floor guidance trackways, and a pendent assembly for the same.

BACKGROUND OF THE INVENTION

Field of the Invention

This invention is in the field of partition assemblies and more particularly folding partitions comprised of a series of panels which may be shifted across an overhead track assembly to divide or subdivide a larger area into two or more smaller areas separated by the partition.

The prior art

It is known to provide top hung, partition forming assemblies comprised of a series of rectangular panels which, in the partition forming position, are disposed in edge-to-edge alignment and extend from the ceiling to or substantially to the floor. Apparatus is provided for shifting the panels from their edge-to-edge relation to a side-by-side storage position in a stacking zone adjacent one of the side walls of the area to be partitioned.

Typical overhead supported folding partitions heretofore known have been of two types, namely:

(1) A center hung, center stacking partition wherein the pendents or hanging mechanisms are fixed to the center of the panels and wherein the panels must be stacked on a line coincident with the center line of the main track assembly;

(2) An edge hung, side stacking partition wherein the pendents are fixed adjacent the edges of the panels and the panels are stacked to one side of the center line of the main track assembly.

In many instances it is desired to have the panels stacked entirely to one or the other side of the line defined by the main track assembly. Such an installation will normally be preferred where the main track extends from a column or projection which intrudes into the area to be divided. In such circumstances, if the panels are stacked in alignment with the column it will be evident that the intrusion will be increased to include the depth of the column as well as the depth of the stacked panels. Where such a constructional feature exists, it would be preferable to run the main track along a line coincident with the center line of the column but store the panels to one or the other side of the column.

Center hung panel assemblies heretofore known are incapable of being side stacked.

To fill the need for a side stacking assembly, resort has been made to the edge hung type of partition above described. While such edge hung partition assembly provides the side stacking feature, it introduces ancillary difficulties which render its use highly undesirable.

Most importantly, edge hung panel assemblies require that a track be laid in the floor to support and guide the panels to and from their extended position. The use of floor tracks is obviously undesirable for both aesthetic and functional reasons. If the area is to be treated with floor tile or carpet, the floor track is particularly conspicuous and unsightly, collects dirt, and is an accident hazard in the sense that women particularly may catch their heels in the track. The hazard will be particularly acute where the panel assembly is employed in school gymnasiums or the like.

An additional disadvantage of edge hung assemblies lies in the fact that, in the stored position, an eccentric or turning moment is exerted by the doors on their pendents and on the supporting section of the track, the moment arising from the fact that the centers of gravity of all panels are offset to one side of the storage track section while the pendents which support the panels from their corners are in alignment with the track. This imbalance results in the requirement of providing unusually heavy supportive structures, pendents and fixtures, and even these expedients may not be altogether successful in assuring against warping or deforming of the track assembly, the pendents, the connection between the pendents and the panels, etc.

SUMMARY OF THE INVENTION

A center hung, side stacking partition defining assembly, either manually or automatically actuated, incorporating a main track section, a storage track section laterally displaced from and parallel with the main track section, and a transition track section angularly oriented with both of said main and storage sections. Each alternate panel is hung on a pendent, the pendents being free for translatory movement along the main track section, the transition section and the storage section, the panels being hingedly connected to each other.

The pendent assemblies provide a lost motion connection between the panel and the pendent so as to permit the pendent to become offset from the center line of the panel as the panel traverses the area between the main and storage track sections, so as to prevent the jamming which would otherwise occur in the absence of such lost motion connection. The assembly includes deflector means to fold the panels as they approach the transitional track section.

Additionally, a stub track section in alignment with the main track section carries a stub panel section to provide support for the innermost end of the panel assembly as well as to permit an initial translatory movement enabling the deflector mechanism to effect the desired initial folding adjacent the transition track.

In accordance with an embodiment of the invention, where the folding of the partitions would be interfered with by a second column adjacent the stacking area, the alternate panels may themselves be segmented and hinged so that, as the panels are shifted to the stacked position, the segmented panels will fold, providing clearance with relation to the second column.

In the automatic or powerized partition assembly of the invention, a driving connection between the lead panel and a source of power in the form of a flexible cable or chain is provided, the cable or chain being reeved to conform with the path of movement of the pendents as they shift along the main section, the transitional section and the storage section. The drive device is characterized by novel flexible drive support means which maintains the flexible connector in the path of movement of the pendents, yet is automatically retracted from the path to permit the pendents to pass.

It is therefore an object of the invention to provide a top, center hung, side stacking partition assembly.

A further object of the invention is to provide a device of the class described which does not require the use of floor tracks.

A further object of the invention is to provide a novel pendent assembly for use with a multiplicity of panels to permit the formation of a center hung, side stacking, partition defining assembly.

Still a further object of the invention is the provision of an assembly of the class described which permits the device to be extended and contracted despite the presence of a column or columns adjacent the stacking area.

A further object of the invention is to provide a device of the class described with novel powerized closer means.

To attain these objects and such further objects as may appear herein or be hereinafter pointed out, reference is made to the accompanying drawings, forming a part hereof, in which:

FIGURE 4 is a magnified sectional view of drive mechanism for operating a partition of the type described;

FIGURE 5 is a section taken on the line 5—5 of FIGURE 2;

FIGURE 13 is a schematic plan view of an embodiment of the invention;

FIGURE 14 is a side elevational view of the embodiment of FIGURE 13.

Figure 1:
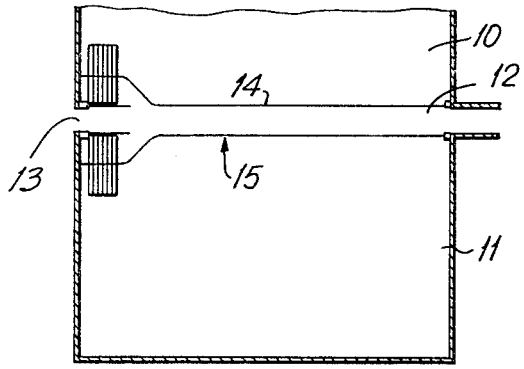
FIGURE 1 is a schematic plan view of a typical installation in which two separate partition assemblies are employed.

Referring now to the drawings, there is shown in FIGURE 1 a plan view of an area divided by two partition assemblies in accordance with the invention.

In the room configuration of FIGURE 1, it is desired in the partition defining positions of the assemblies to provide a first room area 10, a second room area 11 and a central corridor 12. Obviously, when the panels are in stacked condition the areas 10, 11 and 12 will define a single, uninterrupted larger room. An entranceway 13 may be provided which is accessible in both the extended and stored positions of the assembly.

In contrast, as previously noted, the typical center hung panel assembly must stack on the center line of the main track assemblies 14, 15 and, as may be seen from the noted view, the edges of the panels in the stacked position would be so closely disposed as to seal the access way 13.

Figure 2:
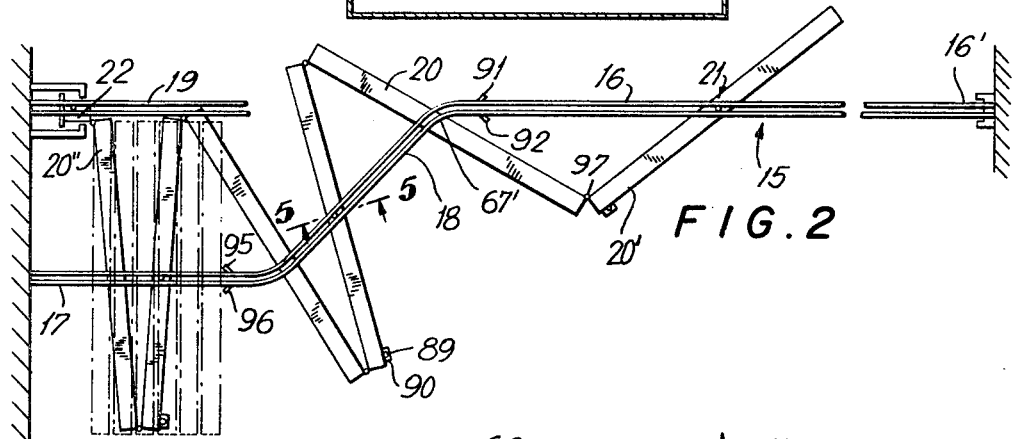
FIGURE 2 is a plan view of a partition assembly in a partially stacked condition.

The panels ride or translate along main track sections 14 and 15 suspended from the overhead. As best seen in FIGURE 2, track assembly 15 includes a main or straight run track section 16 and stacking track section 17, and a transition track section 18 which is angularly oriented to the main and stacking sections 16, 17, respectively, and forms a continuation of said sections. Additionally, a stub track section 19 is disposed in axial alignment with the main section 16 for purposes which will appear hereinafter.

Figure 8:
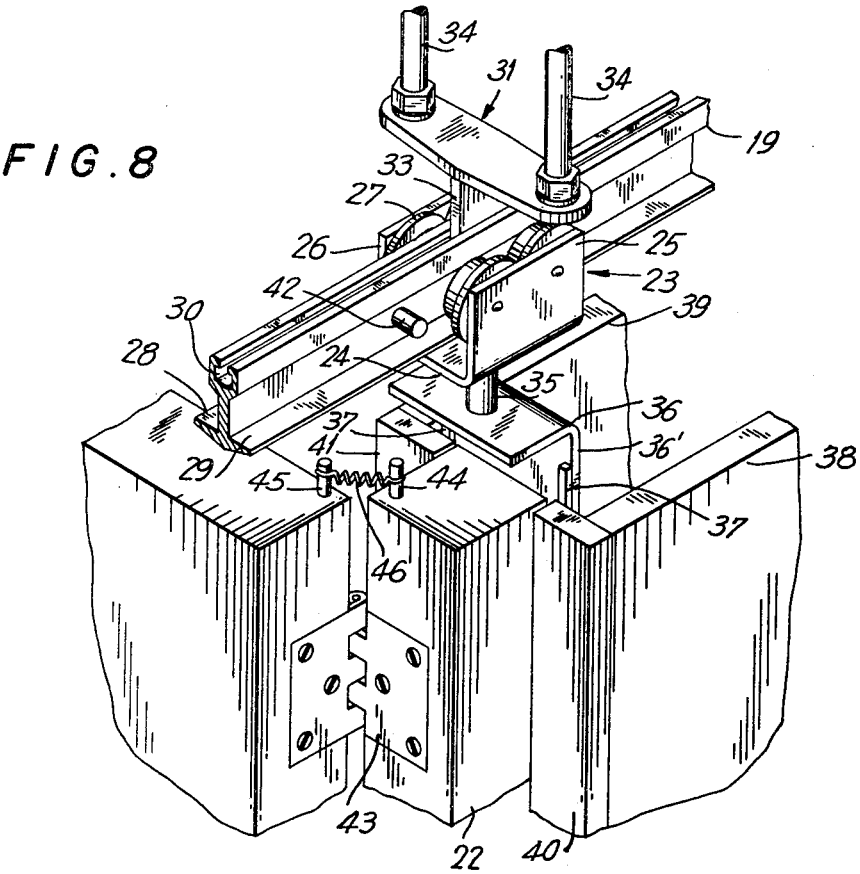
FIGURE 8 is a perspective view of components of the stub section and allied components adjacent the stacking zone.

Mounted on the track assembly 15 are a series of rectangular panels 20 having pendent assemblies 21 which include components affixed to the panels and to the track to permit pivotal and translatory movements of the panels relative to the track. As will be observed from FIGURE 2, each alternate panel 20, beginning with the lead panel 20', is provided with a pendent assembly 21. The innermost panel 20" is hingedly connected to a stub panel section 22, which panel section is slidably supported by an inner pendent 23 (see FIGURE 8) on the stub track section 19.

The inner pendent assembly 23 is essentially conventional, having a U-shaped yoke 24, the legs 25, 26 of which are upwardly directed and carry the roller members 27 which are rotatable about a common horizontal axis. The rollers 27 are mounted for translatory movement along the stub track section 19 by engagement with the laterally directed flanges 28, 29 of the track.

The track 19 is provided with an upwardly open keyway 30, within which keyway is mounted a support bracket 31, the bracket having a key 32 (see FIGURE 4) which fits within the keyway 30. A vertically directed flange member 33 extends through the open uppermost end of the keyway 30 and is welded or otherwise affixed to the bracket 31. A pair of hanger bolts 34, 34 are affixed to laterally spaced portions of the bracket 31, the upper ends of the bolts 34 being mounted to suitably positioned beams of the structure in which the partition assembly is located.

The pendent assembly 23 includes a pendent portion 35 affixed to a right angle bracket 36, the bracket, in turn, being secured to the innermost or stub panel section 22.

The vertical plate 36' of the bracket 36, which preferably extends for a substantial portion of the vertical inner end of the stub panel may advantageously be provided with a pair of vertically directed compressible sealing strips 37, 37.

The stub panel 22 is housed within a short enclosure area defined by side walls 38, 39 and spaced from walls 40, 41. As will best be appreciated from a consideration of FIGURE 8, the opposed faces of the front walls 40, 41 define a slot slightly larger than the thickness of the stub panel 22, permitting the panel 22 to project through the slot defined by the front walls. The vertical arm 36' of the bracket 36, however, is of greater width than the panel and will limit outward movement of the pendent assembly 23 and, hence, the panel. As an additional restraint, a limit pin 42 may extend from the stub rail or track section 19 in the path of the rollers 27.

The stub panel section 22 is hingedly connected to the innermost panel 20" adjacent the storage zone, as by a series of vertically spaced hinge members 43. Optionally and preferably, a pair of spring anchor pins 44, 45 are affixed to the upper edges of the stub panel section and the innermost panel 22 and 20", respectively, a heavy coil spring 46 being secured under tension between said pins. As will be more fully explained hereafter, the spring 46 functions to facilitate complete folding of the innermost panel relative to the stub section 22.

Figure 3:
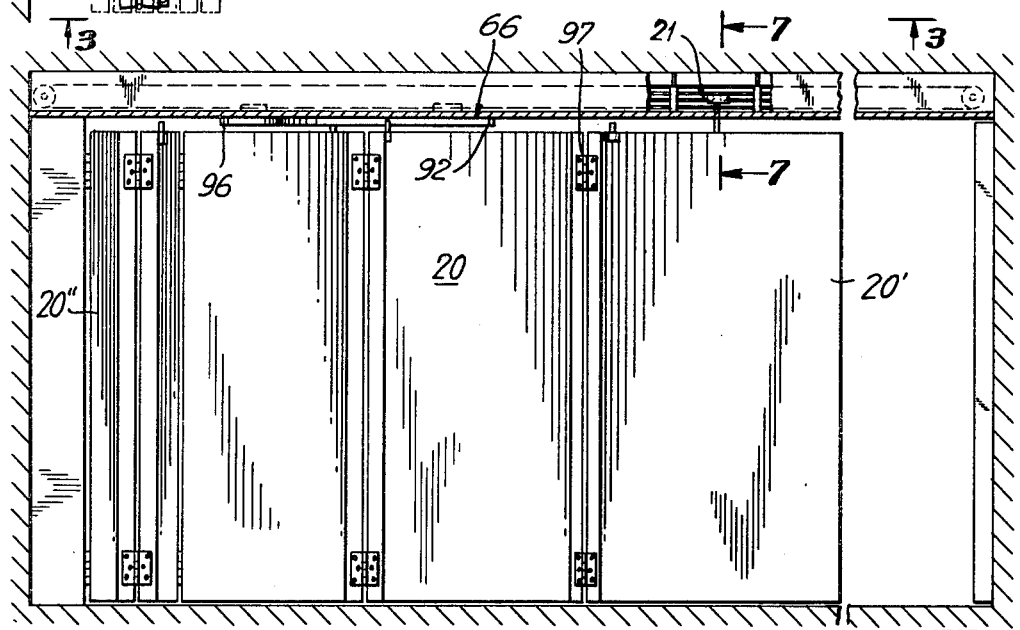
FIGURE 3 is a side elevational view of the partition assembly of FIGURE 2 taken in the direction of the arrows 3—3 of FIGURE 2.

Referring now more particularly to FIGURES 2, 3 and 5, the main, storage and transition track sections 16, 17 and 18, respectively, are essentially similar to the stub section 19 and are supported at spaced intervals by hanger bolts 47 depending from a beam or beams. As in the case of the track 19, the bolts are affixed to mounting brackets 48 having key members 49 riding in the keyway 50 of the track section. The track includes lateral flanges 51, 52, which flanges support the rollers 53 of the pendent assemblies 54 next to be described.

The pendent assemblies, and particularly the relation between the pendents and the panels in the combination, is unique and forms an important feature of the invention. Briefly, the pendents are mounted to the panels substantially at the center line of the panels but are so connected as to permit a shifting of the center line of the panels with respect to the position of the pendents. More specifically, the pendent assemblies and panels are interconnected to permit the panels to shift horizontally relative to the pendent assemblies. It has been determined that such horizontal shifting movement is imperative to permit the translatory movement of the panels from the straight main track section, across the transition track section and thence to the storage section.

Figure 7:
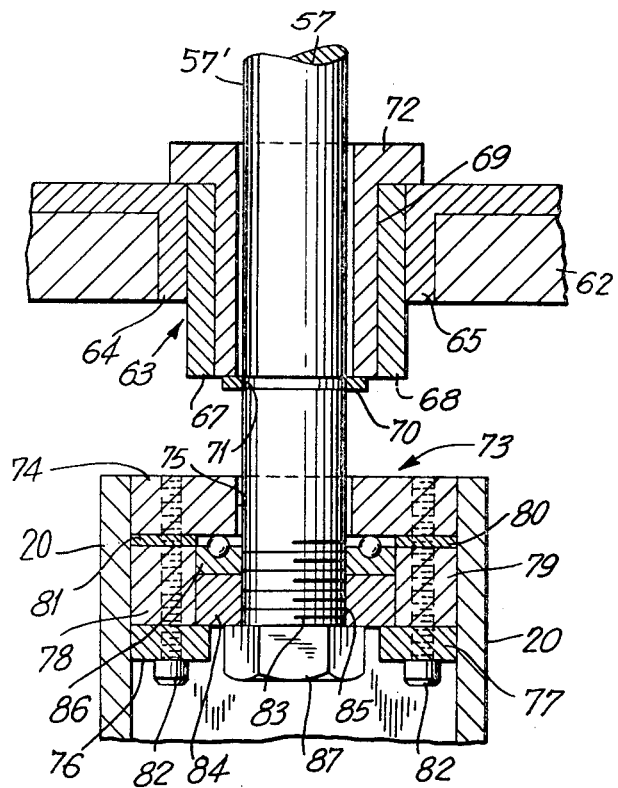
FIGURE 7 is a magnified fragmentary vertical section on the line 7—7 of FIGURE 3 through a door pendent assembly.
Figure 6:
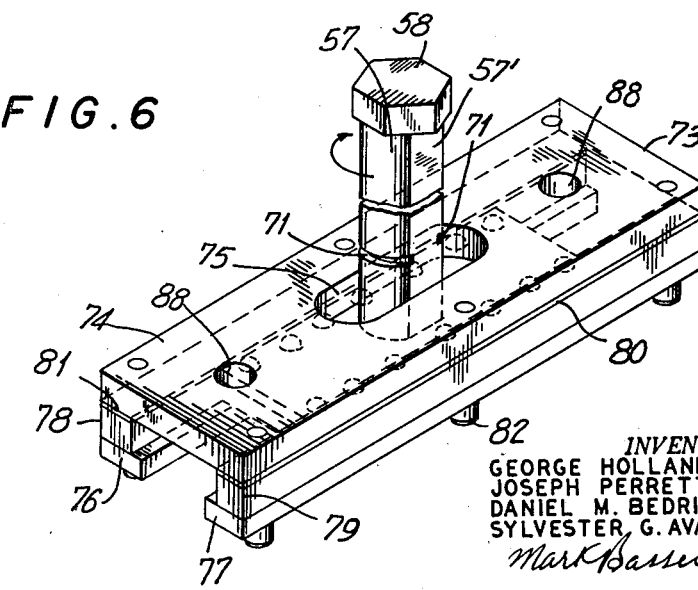
FIGURE 6 is a perspective view of the pendent component affixed to the door.

Turning now to FIGURES 5, 6 and 7, the rollers 53 which ride on flanges 51, 52 are rotatably connected to an upwardly directed U flange 55, the central branch 56 of which is centrally apertured for the passage therethrough of a pendent pin 57. The pin 57 is headed at 58, the head lying above the aperture of the branch 56, an anti-friction bearing 59, such as a ball bearing, being interposed between the head 58 and the branch 56 to permit relative rotation of the U-shaped flange 55 and the pendent pin 57.

Preferably, for aesthetic considerations, a decorative U-shaped enclosure 60 is provided, the enclosure being fastened to spaced box brackets 61 mounted by the hanger bolts 47 with the mounting brackets 48. The lower wall 62 of the enclosure 60 may either be flush with the ceiling of the room or the enclosure 60 may project downwardly from the ceiling of the room. In either case, the lower wall 62 defines a central slot 63, the innermost trackway or extremity of which is lined by depending flanges 64, 65 forming a component of the box brackets 61.

Figure 12:
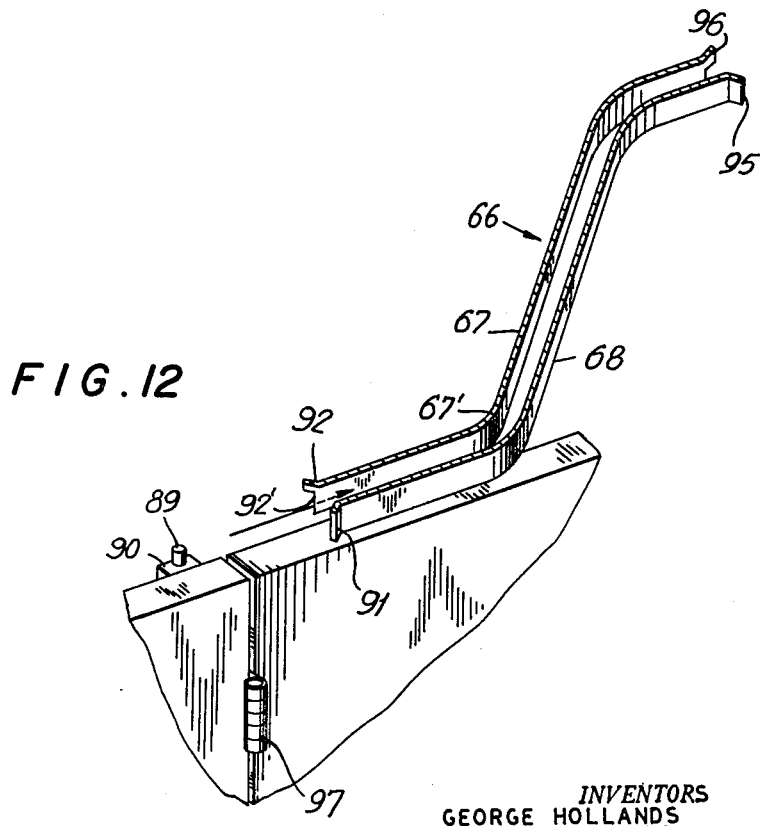
FIGURE 12 is a perspective view of the deflector and guide assembly adjacent the stacking zone.

In addition, a short guideway assembly 66, comprising a pair of parallel, vertically directed side rails 67, 68, are affixed to the depending flanges 64, 65 as by welding in the area adjacent the transition track section (see FIGURES 2 and 12). The pendent pin which, as best seen in FIGURE 6 includes flattened side portions 57′, includes a roller sleeve 69 rotatably supported on the pin as by a snap ring 70 seated in a recess 71 circumferentially of the pin.

The roller includes a horizontal annular shoulder 72 which rides against the upper surface of the flanges 67, 68, the roller being free to rotate about the pin and thus facilitate movement of the pin between the guide walls 67, 68 and flanges 64, 65 with minimal friction.

A pendent support assembly 73 is mounted in the upper edge of the panels 20 to receive the lower end of the pendent pin. The pendent supports comprise an upper, horizontally directed plate 74 having a central, longitudinally extending clearance slot 75. To the plate 74 are mounted a pair of spaced, opposed guide flanges 76, 77 having their inwardly directed opposed edges spaced apart to define a longitudinally open slot, the guide flanges being maintained in spaced relation to the plate 74 by spacer blocks 78, 79 which are of lesser lateral dimension than the flanges 76, 77.

Preferably a pair of clearance shims 80, 81 are interposed between the spacer blocks 78, 79, respectively, and the plate 74, the parts being maintained in the noted positions by vertically directed machine screws 82.

The pendent pin 57, at its lower end, is threaded as at 83. A slide block 84 is provided with a threaded aperture 85 to which the threaded portion 83 of the pin is connected. A roller bearing support plate 86 which, like the slide block 84 is of essentially rectangular configuration, is interposed between the slide block 84 and the under surface of the plate 74. The slide block 84 and the plate 86 are dimensioned to provide sliding clearances with the longitudinal side edges of the spacer block 84 and support plate 86, shims 80, 81 providing sufficient clearance to permit the bearing support plate 86 to ride freely back and forth against the under surface of the plate 74. A locking nut 87 is threaded over the lowermost threaded portion 83 of the pin 57 to secure the pin to the slide block 84.

From the foregoing it will be appreciated that when the pendent support 73 is affixed within a mortised recess in the upper edge of panels 20 by fastener means (not shown) which may extend through the apertures 88, 88 formed in the plate 74, that the panels are connected to the pendent 57 to permit a longitudinal relative movement between the pendent pin 57 and panels 20, the extent of such movement being governed by the length of clearance slot 75 formed in said plate.

Certain of the panels of the assembly are provided with deflector pins 89 which are mounted on deflector brackets 90 fixed to the sides of the panels which are located adjacent the storage track 17. As best seen from FIGURE 12, the side rails 67, 68 of the guide assembly 66 extend substantially from the area of the main track section 16 adjacent the transition section, along the transition track section 18 and terminate adjacent the beginning of the storage section 17. Preferably, as best seen in FIGURES 2 and 12, a series of centering lips 91, 92, 95, 96 may be formed along the length of the guideway assembly 66 immediately adjacent the areas where it is desired precisely to dispose the pendents and, hence, the panels supported thereby, in centered position relative to the track sections. Thus, the centering lips 91, 92 are located adjacent the junction between the main section 16 and transition track section 18, and the lips 95, 96 are disposed adjacent the junction between the storage section 17 and the transition section 18. The importance of aligning the panels in these areas is to assure that the deflectors 89 are disposed adjacent the outer surface of the section 67.

The lips of the side rails 67, e.g. lip 92 (see FIGURE 12) are cut away or recessed at the lower or panel adjacent portion 92′ to permit the deflector pins 89 to pass beneath the lip portion 92, the pendent pins 57 of course extending between the guides.

As best seen in FIGURES 2 and 3, the adjacent panels are hingedly connected to each other at their edges by conventional hinges 97, the hinges being arranged so that the connections at opposite edges of any given central panel fold in opposite directions.

The operation of the simplest form of the device heretofore described may best be appreciated by a consideration of FIGURES 2 and 3. The panels are shown in FIGURE 2 in dot and dash lines in their stored position. The panels may be manually moved to the fully extended position by grasping the lead panel and pulling it toward the end 16′ of the track. The panels will roll along the track from the storage section 17 to the transition section 18 and thence to the main track section 16.

In the movement from the storage to the main track section and back, it has been determined that a jamming or wedging action would occur as the pendents are directed across the curved track sections were it not for the use of the described pendent assemblies. Without limitation to any particular theory, it is believed that the wedging or jamming action, which we have determined to be unrelated to any particulars of panel size, track angles or the like, results from a complex geometric interaction engendered by the fact that the panels are hingedly connected and, thus, longitudinal relative movement is possible only where accompanied by a concomitant pivoting and lateral movement.

The pendents, of course, are limited to following the path of the tracks. Thus, in the folding and unfolding movements, the path traced by the hinged connection points between panels will differ from and not bear any predetermined fixed relation to the pendent paths since, in the course of the translatory movement about the curved track section, the angular relation between panels and, hence, longitudinal spacing of hinge lines will continuously vary. The problem is rendered more difficult by the fact that the panels do not always fold in the identical manner and, thus, the paths of the hinge lines and pendents may vary from closing to closing.

The geometry of the design is further complicated by the fact that certain of the panels remain aligned on the straight track section, while others are folding relative to the panels in the straight section only, and still others, in the course of moving on the transition track, are folding relative to each other and to the panels on the straight section.

By employing a sliding connection between the pendents and panels, it is possible for the center line of the panel to be temporarily offset from the pendent pins 57, thus to accommodate to the differently related paths of the pendents and the fold line during stacking and unstacking movements of the panels.

After the panels are moved to the fully extended position, i.e. after all of the panels are disposed in edge-to-edge alignment, the final extending movements are accompanied by an axial outward movement of the stub panel section 22 within the confines of the stub panel enclosure.

Figure 11:
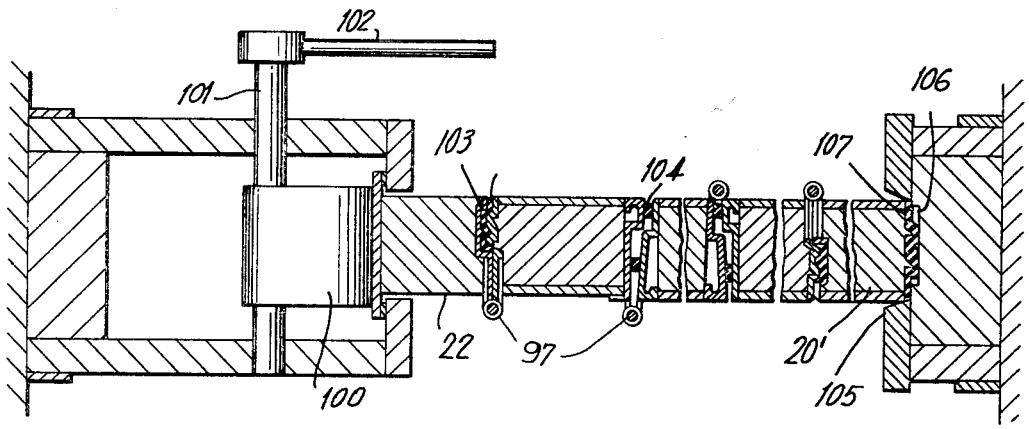
FIGURE 11 is a horizontal sectional view of a sound-proofed embodiment of the invention.

Optionally, and to assure a soundproof connection between the panels, a cam assembly as shown in FIGURE 11 may be provided. In accordance with this assembly, in the fully extended position of the panels a cam member 100, mounted on cross shaft 101, is activated by rotation of the cam lever 102 to press against the vertically extending leg of the bracket 36 affixed to the rear face of the stub section 22. The operation of the lever 102 will thus impart translatory movement of all of the panels to the right as shown in FIGURE 11, jamming the panels in their extended positions.

Preferably sealing elements 103, 104 may be provided between adjacent hingedly connected panels. For even greater sound-proofing characteristics, the panel edges may, additionally or in lieu of the compressible seals described, incorporate zig zag or discontinuous end strips, such as are shown in United States Patent No. 3,063,105 to eliminate any direct sound paths through the edge-to-edge oriented panels.

Similarly, an end seal 105 may be provided at the lead edge of the lead panel 20' to effect a sealing connection with the vertical edge 106 in the jamb pocket 107.

When the panel is to be shifted from the extended to the stacked position, the lever 102 is reversely shifted to permit a stub section 22 to move inwardly. It is important that the deflector pin 89 of the panel adjacent the lead curved portion 67' of the slide rail 67 be disposed immediately adjacent said curved portion. The importance of this relation of the pin to the curved portion is that only a limited inward movement of the stub panel 22 on the track section is permitted. In the course of this limited movement, it is necessatry to generate a deflecting force sufficient to begin the lateral movement of the first panel to be folder and, thus, the disposition of the initial deflector pin must permit the engagement with the camming section 67' of the side rail within the range of translatory movement permitted.

As the panels continue to be shifted toward the stacked or dot and dash position shown in FIGURE 2, the successive pendents will continue to advance along the main track section 16 to the transition section 18 and finally to the storage section 17.

As previously described, the closing movements of the panel also require for their successful completion a lateral shifting between the pendents and the panels, to avoid jamming. To facilitate movement to the storing position, the spring 46 which is located outside of the center line of hinge 43 of the stub section induces the innermost full panel 20'' to assume a right angular relationship with respect to the stub panel 22.

In many instances it is preferred to provide a mechanical drive, powerized movement of the panels to and from their extended and contracted positions. A suitable drive mechanism is depicted in FIGURE 4. Since, for the most part, the drive mechanism per se is conventional, the description thereof will be limited to that necessary for an understanding of the invention.

A weldment 120 hung from the support beam 121 carries a drive motor 122 which, through a clutch 123 operates a cable traction drum 124 carrying several convolutions of driving cable. The cable is fed from the drum about horizontally directed idler pulley 125, the cable being maintained on the surface of the pulley 125 by a retainer pulley 126.

As best seen in FIGURE 3, the cable is reeved in endless fashion, with one end 127 fixed to the trailing end of bracket 128 of the pendent assembly carried by the lead panel 20'. The other terminal end 129 of the cable is fixed to bracket 130 at the lead end of the pendent assembly.

Operation of the motor and clutch will rotate the drum, driving the cable in one or the other direction depending on whether the panel is to be extended or contracted. It is imperative that the cable path follow as nearly as possible the path of movement of the pendents as they traverse the main, transition and storage track sections. The cable C is supported in the desired path by a novel, retractible pulley assembly 131 next to be described.

The pulley assembly 131 includes fixed bracket 132 disposed at a height corresponding essentially to the center of the pending pins 57. A plunger 133 extends slidably outwardly of the bracket, the plunger being of a rectangular or other irregular section and extending through a complementally shaped opening in the front wall 134 of the bracket (see FIGURE 9). The plunger includes a backing plate 135 of a size to prevent outward passage of the plunger through the opening, a heavy spring 136 being compressed between the backing plate 135 and a rear wall 137 of the bracket.

A generally U-shaped yoke 138 is fixed to the outermost end of the plunger 133 and carries an idler pulley 139 rotatable about a vertical axis, a pulley support pin 140 extending through the parallel arms of the yoke providing the rotatable connection for the pulley.

Figure 9:
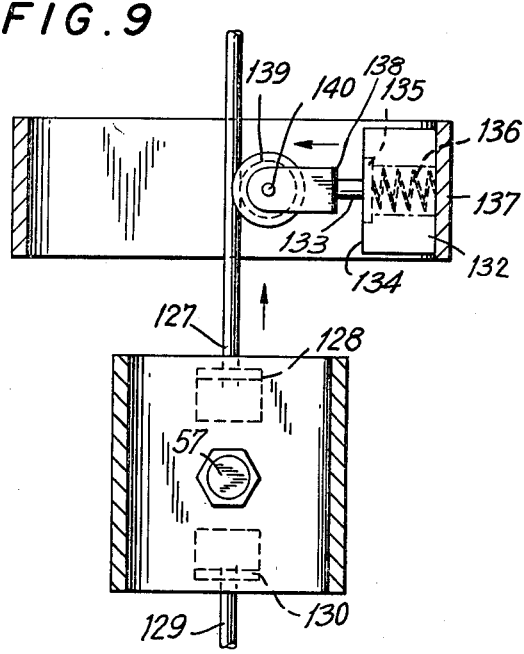
FIGURES 9 and 10 are schematic sectional views taken on the line 9—9 of FIGURE 4.
Figure 10:
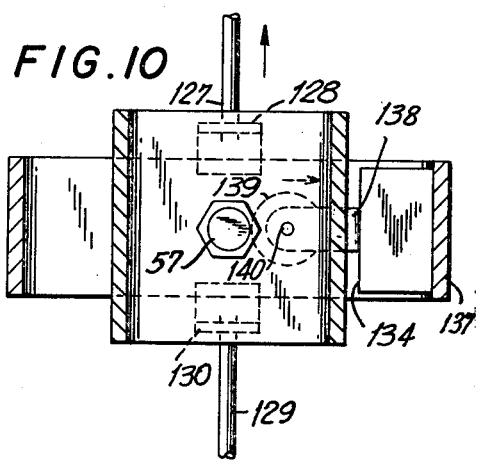

The cable C is disposed within the nip or concavity of the pulley 139 under tension. Normally, as shown in FIGURE 9, the pulley 139 is projected laterally into the path of the pendent 57 by the spring 136. However, as the pendent 57 (and each succeeding pendent) passes the station at which the extensible pulley 139 is located, the cable is engaged by the pendent (see FIGURE 10) to cam the pulley inwardly to the interior of the bracket 132, the pulley again being projected outwardly after the pendent has passed. Two such retractible pulleys are normally provided at the beginning and end of the transition track section to assure that the cable follows the track path, including the curved junctions between the transition section and the storage and main sections.

By this means, the cable is enabled to be supported at a position substantially coincident with the center line of the track sections, including particularly the curved portions, without interference by the pendents as they pass.

In FIGURES 13 and 14 there is shown a still further embodiment which is particularly useful in situations where a column 200 is located adjacent the folding zone. It will be observed from the dot and dash view of the panel, FIGURE 13, that a normal panel would, in the course of folding, be deflected against the column 200 and thus a jamming would occur which would prevent the proper operation of the device. In order to permit the panels to clear without interfering with the column 200, each alternate panel, in the illustrated embodiment the pendent carrying panels, are subdivided into panel sub-sections 201, 202 about hinge points 203 offset from the center line of the panels.

As best seen from FIGURES 13 and 14, in the course of folding for storage or unfolding for movement to the extended position, the sub-panels 201, 202 are folded about the hinge lines 203, whereupon each of the sub-sections is permitted to swing past the column before folding into alignment in the movement of the panels to the stacked position.

In the course of movement toward stacked position, some restraining means is preferably provided to maintain the trailing panel section 202 in folded position relative to the leading portion 201 until the trailing portion has cleared the column 200. The restraining means preferably takes the form of an offset pin 204 extending upwardly into the path of a depending, short, offset track section 205, FIGURE 14. The track section terminates at a position beyond the column, thus permitting the short panel section 202 to pivot in an anti-clockwise direction, as depicted in FIGURE 13, after the short panel section has cleared the column.

From the foregoing it will be appreciated that there is provided a multiple panel structure adapted to be moved from partition forming to stacked position and to stack at a position offset from the center line of the main track without the necessity of providing floor guide assemblies. The panels are of the center hung variety and thus avoid the torsional stresses and floor tracks typically employed in panel units of the corner hung type.

The panels may be operated either manually or by motorized mechanism, novel provision being made for directing the cable drive assembly around the curved track section while maintaining the cable aligned substantially with the center line of the track at all positions thereof.

By the use of novel pendent assemblies which permit the center lines of the panels to shift relative to the pendents, movement of the panels between stacked and unstacked positions may be effected without the jamming which would otherwise inevitably occur if the construction were attempted to be fabricated with a permanently positioned pendent.

While a pendent assembly has been shown in conjunction with a center hung panel assembly, it will be appreciated that there may be other environments in which the shiftability of the pendents horizontally relative to the panels may be employed to advantage. In other words, there may be panel guide situations heretofore considered impossible of construction which may be rendered possible through the use of the novel pendent assemblies herein described.

It will further be appreciated that in accordance with an embodiment of the invention means are provided for shifting the panels to a stacked position in an area adjacent a column which would otherwise block movement or interfere with movement to the stacked position by interference with the folding or deflecting of the panels.

Obviously, where additional soundproofing is desired, yieldable sealing strips or the like may be disposed adjacent the upper edges of the panels to prevent the direct transmission of sound over the top of the panels. Similarly, vertically shiftable floor sealing devices may be carried in the lower edges of the panels, to be manually or automatically shifted into contact with the floor in the partition defining position of the panels, to prevent the transmission of sound underneath the panels and to rigidify the units in relation to the floor. Suitable sealing mechanisms are shown in United States Patents Nos. 3,086,261, 3,126,048 and 3,126,050.

Many modifications of the embodiments illustrated and described will obviously be available to the skilled worker in the art. Accordingly, the invention is not to be considered restricted to the illustrated constructions but, rather, is to be broadly construed within the scope of the appended claims.

Having thus described the invention and illustrated its use, what is claimed as new and is desired to be secured by Letters Patent is:

1. A multi-panel folding door assembly shiftable between an end-to-end extended partition defining position and a one side of center stacked storage position, comprising a horizontal overhead track assembly having a main track section, and a storage track section having a transition portion angularly oriented with respect to and forming a continuation of said main section, a plurality of generally planar panel members having their edge portions hingedly connected to each other, hanger means connecting each alternate panel to said track assembly for translatory movement therealong, said hanger means including a pendent portion depending from said track, a pendent support mounted on said alternate panels substantially at the horizontal center line thereof, and lost motion coupling means interposed between said pendent and pendent support for permitting horizontal relative movement between said panels and said pendents.

2. A device in accordance with claim 1 and including deflector means for folding the panels adjacent the junction of said main and storage track sections responsive to movement of said panels from said extended toward said stacked position.

3. A door assembly in accordance with claim 1 and including a stub track section in alignment with said main track section, stub hanger means mounted on said stub section for movement therealong, a panel section depending from said stub hanger means and hinge means connecting the end panel member to said panel section.

4. A door assembly in accordance with claim 1 wherein said pendent support includes a guide slot aligned with the plane of said panel members, said pendent portion extending through and being shiftable longitudinally within said guide slot.

5. A device in accordance with claim 1 and including anti-friction means interposed between said pendent portion and said pendent support.

6. A device in accordance with claim 1 and including a deflector portion adjacent the junction of said main and storage track section and deflector means mounted adjacent the upper edges of selected panels in the path of said deflector portion for laterally shifting said selected panels toward said storage section responsive to translatory movement of said panels from said unfolded to said storage position.

7. A device in accordance with claim 3 and including a deflector portion adjacent the junction of said main and storage track sections and deflector means mounted adjacent the upper edges of selected panels in the path of said deflector portion for laterally shifting said selected panels toward said storage section responsive to translatory movement of said panels from said unfolded to said storage position.

8. A device in accordance with claim 7 wherein one said deflector means is engaged against said deflector portion responsive to initial translatory movements of said stub hanger in said stub section.

9. A device in accordance with claim 1 wherein said alternate panels comprise first and second, hingedly connected panel elements, said panel elements being folded about said hinged connection as said panels are shifted from said main track section to said storage track section.

10. A device in accordance with claim 1 and including powerized closer means for shifting said assembly between said unfolded and storage positions, said powerized means including an endless, flexible drive band operatively connected to the lead panel member and anti-friction means supporting said drive band in alignment with said main and storage track sections, at least one said anti-friction means adjacent the junction between said main track section and storage track section being yieldably biased into the path of said pendent portions as said portions are shifted from said storage to said main track section, said one antifriction means being cammed clear of said path responsive to passage of said pendents.

11. A multi-panel folding door assembly shifting between an end-to-end unfolded partition defining position and a one side of center stacked storage position, comprising a horizontal overhead track assembly including a main track section, a storage track section parallel with said main track section and longitudinally displaced therefrom, a transition section connecting said main and storage sections and angularly related to both said sections, a stub section longitudinally spaced from and axially aligned with said main track section, a plurality of generally planar panel members having their adjacent edge portions hingedly connected to each other, a stub panel section mounted on said stub track portion for axial movement therealong, said stub panel section being hingedly connected to the end panel member adjacent said storage zone, hanger means mounted for translatory movement along said main, transition and storage track sections connected to each alternate panel, said hanger means including a pendent portion mounted on said track sections, a pendent support mounted on said alternate panels substantially centrally thereof, lost motion coupling means interposed between said pendents and pendent supports for providing relative horizontal movement between said pendents and panels in the plane of said panels and deflector means for angularly orienting adjacent coplanar panels as said panels are shifted from said main to said transition track section.

12. A device in accordance with claim 10 wherein said pendent supports include horizontally directed slot portions and said pendents extend through and are longitudinally shiftable within said slot portions.

13. A device in accordance with claim 12 and including anti-friction means interposed between said pendents and said pendent supports for facilitating said relative longitudinal movement.

14. For use in a side stacking, center hung, multi-panel folding door assembly shiftable between an end-to-end unfolded partition defining position and a one side of center stacked storage position along a track assembly, which includes a main track section, a storage track section generally parallel with said main section, and a transition section connecting and angularly oriented with respect to said main and storage sections, a hanger assembly for centrally connecting alternate panels of said door assembly with said track comprising roller means mounted for translatory movement along said track assembly, panel carrier means for connection to the center of said alternate panels, and vertical support means interposed between said carrier means and roller means for linking said carrier means and roller means, said support means including a lost motion coupling means for permitting horizontal and pivotal relative movement between said carrier and roller means.

15. A device in accordance with claim 14 wherein said carrier means includes a horizontal, longitudinally directed slot and said vertical support means is shiftable longitudinally within said slot.

16. A device in accordance with claim 15 and including anti-friction means interposed between said vertical support means and said carrier means.

17. A multi-panel folding door assembly shiftable between an end-to-end extended partition defining position and a one side of center stacked storage position, comprising a horizontal overhead track assembly having a main track section and a storage track section having a transition portion angularly oriented with respect to and forming a continuation of said main track section, a plurality of generally planar panel members having their edge portions hingedly connected to each other, hanger means connecting each alternate panel to said track assembly for translatory movement therealong, said hanger means including a pendent portion movable along and depending from said track, a pendent support mounted on said alternate panels substantially at the horizontal center line thereof, said alternate panels each comprising first and second, hingedly connected panel elements, and means for folding said panel elements about said hinged connection as said panels are shifted from said main track section to said storage track section.

References Cited

UNITED STATES PATENTS

| | | | |
|---|---|---|---|
| 835,701 | 11/1906 | Burford | 160—199 X |
| 1,833,496 | 11/1931 | Phillips | 160—199 X |
| 1,868,233 | 7/1932 | Hungerford | 160—196 |
| 2,042,084 | 5/1936 | Winn | 160—199 |
| 2,151,033 | 3/1939 | Jones | 160—199 X |
| 2,175,323 | 10/1939 | Shepard | 160—206 |
| 2,493,815 | 1/1950 | Guilbert | 160—206 |
| 2,929,445 | 3/1960 | Haws | 160—199 X |
| 3,073,383 | 1/1963 | Crick | 160—199 X |
| 3,080,506 | 4/1968 | Good et al. | 160—199 |

PETER M. CAUN, Primary Examiner